United States Patent
Shoup

(10) Patent No.: US 12,018,408 B2
(45) Date of Patent: Jun. 25, 2024

(54) METHOD AND APPARATUS FOR RINSING COIR

(71) Applicant: GENUS INDUSTRIES, LLC, Oregon City, OR (US)

(72) Inventor: David E. Shoup, Oregon City, OR (US)

(73) Assignee: Genus Industries, Inc., Oregon City, OR (US)

( * ) Notice: Subject to any disclaimer, the term of this patent is extended or adjusted under 35 U.S.C. 154(b) by 469 days.

(21) Appl. No.: 17/240,778

(22) Filed: Apr. 26, 2021

(65) Prior Publication Data

US 2022/0341062 A1    Oct. 27, 2022

(51) Int. Cl.
*D01G 9/16* (2006.01)
*B65G 33/10* (2006.01)
(Continued)

(52) U.S. Cl.
CPC .............. *D01G 9/16* (2013.01); *B65G 33/10* (2013.01); *B65G 37/005* (2013.01); *D06B 1/02* (2013.01);
(Continued)

(58) Field of Classification Search
CPC ........ D01G 9/16; B65G 33/10; B65G 37/005; B65G 2203/042; D06B 1/02; D06B 23/04; D10B 2201/01
See application file for complete search history.

(56) References Cited

U.S. PATENT DOCUMENTS

| 2,418,995 A | * | 4/1947 | Thomas | ................ | D01G 21/00 |
| | | | | | 19/65 R |
| 2,890,146 A | * | 6/1959 | Unsworth | ................ | D04H 1/00 |
| | | | | | 428/218 |

(Continued)

FOREIGN PATENT DOCUMENTS

| CN | 105614914 A | 6/2016 |
| CN | 112640763 A | 4/2021 |

(Continued)

OTHER PUBLICATIONS

International Search Report and Written Opinion, PCT/US22/25714, dated Sep. 28, 2022, 13 pp.

*Primary Examiner* — Shaun R Hurley
(74) *Attorney, Agent, or Firm* — Miller Nash LLP

(57) ABSTRACT

An apparatus has one or more conveyor systems, each conveyor having a conveyor bed having a first end, and a second end opposite the first end, a conveyance mechanism configured to move material from the first end to the second end, a material inlet at the first end, a material outlet at the second end, and a waste discharge outlet, at least one liquid dispenser arranged to dispense liquid into each conveyor bed, and at least one sensor at least partially inserted into each conveyor bed, wherein the material inlet of the one or more conveyors is configured as an initial material inlet, and the material outlet of the one or more conveyors is configured as a final material outlet. A method of rinsing coir includes moving the coir through at least two conveyor beds, applying liquid to the coir as it moves through the at least two conveyors, monitoring a composition of the liquid in the conveyor beds, and automatically adjusting application of the liquid based upon the monitoring.

17 Claims, 6 Drawing Sheets

(51) Int. Cl.
*B65G 37/00* (2006.01)
*D06B 1/02* (2006.01)
*D06B 23/04* (2006.01)

(52) U.S. Cl.
CPC ........ *D06B 23/04* (2013.01); *B65G 2203/042* (2013.01); *D10B 2201/01* (2013.01)

(56) References Cited

U.S. PATENT DOCUMENTS

| | | | |
|---|---|---|---|
| 2008/0073043 A1* | 3/2008 | Greschik | D21C 9/18 |
| | | | 162/17 |
| 2010/0176354 A1* | 7/2010 | Costard | C08J 5/06 |
| | | | 252/601 |
| 2011/0200814 A1* | 8/2011 | Hernandez-Torres | |
| | | | C09J 105/06 |
| | | | 428/292.1 |
| 2018/0000307 A1* | 1/2018 | Henry | D06B 3/02 |
| 2018/0016498 A1* | 1/2018 | Shoup | B02C 18/142 |
| 2018/0057966 A1* | 3/2018 | Spittle | D01G 7/02 |

FOREIGN PATENT DOCUMENTS

| | | |
|---|---|---|
| WO | 2013136341 A1 | 9/2013 |
| WO | 2021063377 A1 | 4/2021 |

* cited by examiner

METHOD AND APPARATUS FOR RINSING COIR

TECHNICAL FIELD

This disclosure relates to preparation of coir, more particularly to methods and apparatus for reducing the electrical conductivity of coir.

BACKGROUND

As used here, the term cocopeat, coir, coco, and coir pith all refer to loose coconut husk material, which may be shredded and mixed with inner husk pith materials. Some may be familiar with the material available as bricks of compressed material. Soaking it and separating it allows it to be used in one of many applications. Gardening environments have several applications that may use coir, such as moisture retention, soil amendments, etc.

However, an issue that can arise with the natural state of coir lies in its native electrical conductivity. The measure of electrical conductivity (EC) captures the level of total dissolved salts in the media. Each type of plants has different needs, but in general most grow media should have an EC of less than 1.0 mS/cm with test method $EC_{1:1.5}$. This method measures 1 part coco to 1.5 parts distilled water. After agitating the coco, the mix settles and an EC meter measures the EC. However, hydroponics applications may use media with EC as low as 0.30 mS/cm. All measures of EC used in this discussion are by the $EC_{1:1.5}$ method.

Previous approaches of adapting coir typically involve washing to obtain an EC of 1 or 1.6. Currently, only higher quality and higher priced coco products undergo washing multiple times and have an EC or 0.7 or lower. Multiple washing and rinsing processes both slow down the production and raise the cost. Current processes soak coir in large concrete pools, tubs or treatment bays by fully submerging or sprinkling the coir for long periods of time. Further, it is difficult to regulate the exposure of the coir to treatment agents in these large containers. Also, testing remains inconsistent because the large containers make it difficult to uniformly spread the treatment agents into the coir.

DETAILED DESCRIPTION OF THE EMBODIMENTS

The embodiments here provide a precise method of controlling the rinsing process and/or the buffering process for coir material. Some embodiments use screw conveyors to gradually and constantly move the material in a defined channel and at a controlled rate. The apparatus also provides for consistent application of the liquid, whether water or buffered treatment solution. By separating the coir material through the screw conveyors and then drying it on further conveyors, the testing can have much higher consistency. In addition, the apparatus allows for uniform dispersion of any treatment agents used and monitoring of both the electrical conductivity of the coir and the balance of the treatment agents. Even further, the conveyors provides a more consistent way to sterilize the coir using low and high pressure steam.

Figure 1:
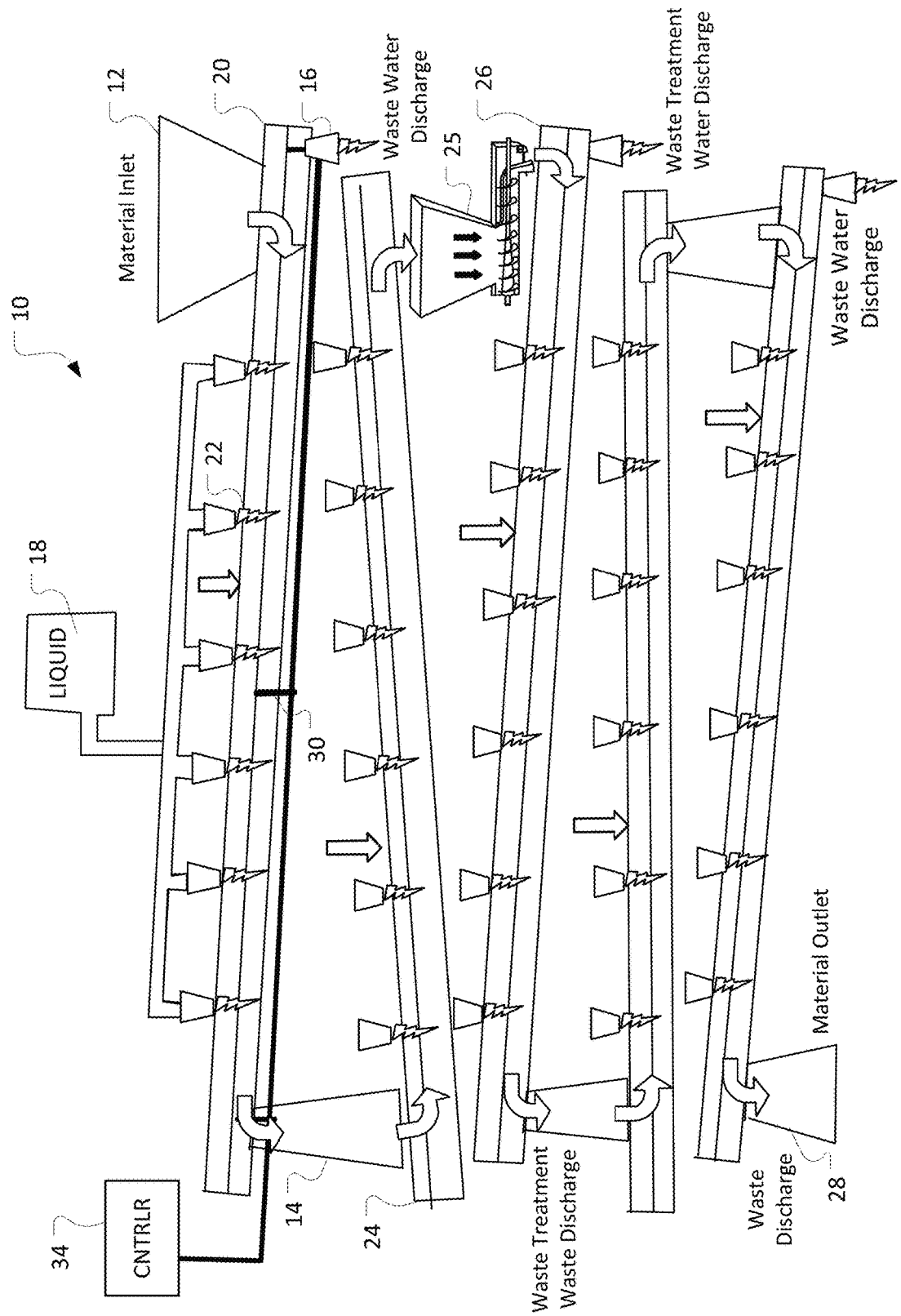
FIG. 1 shows an embodiment of a system for washing and rinsing coir.

FIG. 1 shows a first embodiment of an apparatus to rinse, treat and/or sterilized coir. One should note that any embodiment having a particular aspect or component, such as individual or connected rinse heads/applicators, open or closed conveyor beds, screw conveyors, shafted or shaftless, monitoring sensors number and locations, use of a controller or not, applies to any and all embodiments discussed here, whether explicitly stated or not.

In FIG. 1, the apparatus comprises an apparatus 10 in a configuration referred to here as "vertical" in which the conveyor beds stack vertically relative to each other. The apparatus here shows 5 conveyor systems, but could have a few as one or as many as desired. The particular embodiment has 5 conveyors because the first conveyor provides a cleaning rinse, the second and third conveyors allow application of treatment agents, such as calcium nitrate, the fourth conveyor may apply further mixtures to adjust the pH of the material to achieve a desired alkalinity or acidity, and the fifth conveyor then allows for a low EC water rinse. However, this is merely one embodiment. The system may include only one conveyor and the application of water and or buffering and treatment agents may occur by different applicators applying different solutions as the material moves. If more than one conveyor is used, any reference to a component being "between" a first and second conveyor means that the component resides somewhere between the first and second conveyors, even if more conveyors are also between the first and second conveyors.

Each conveyor system such as 20 has a material inlet such as 12, a conveyor bed having first end and a second end opposite the first end. The material inlet 12 resides at the first end, and a material outlet such as 14 resides at the second end. The conveyor system has a waste discharge outlet 16. While FIG. 1 shows the waste discharge outlet at the first end, but could be located at any point of the conveyor bed.

The system may include one or more aging hoppers, such as that shown as 25, between the second and third conveyors of the particular embodiment, but may be included anywhere in the system as needed. The hopper allows the material to "age" after application of one or more agents to the material. This allows the material combined with the treatment to reach a consistent level of treatment agents throughout the material. The hopper may take material from a conveyor in the system that applied a treatment solution. The size of the hopper, as well as any conveyance mechanism included inside, can regulate the amount of time available to age the material. Larger hoppers will pass the material through more slowly, as they can hold more material, allowing for longer aging. As will discussed in more detail further, the speed of the conveyors may also be controlled to allow the material to age. The amount of time needed to age the material depends upon the concentration of the treatment agent in the applied solution, the speed of the conveyors that may provide some level of aging, and the density of the material, among other factors, so the exact time of aging is left to the system designer. Aging may occur for a period of time in the range of 2 to 24 hours.

The embodiment of FIG. 1 shows the conveyor beds of each system angled relative to being flat horizontal, with the material outlet end being higher than the material inlet end. This comprises merely one embodiment and the conveyor beds could be tilted with the inlet end higher than the outlet end, or the conveyor beds could be flat. In the embodiment shown, having the waste discharge outlet at the lower end, allows gravity to assist with the waste discharge process.

As will be discussed in more detail later, the conveyor beds may comprise an open bed, meaning that the top of the beds are open to the atmosphere. In other embodiments, the conveyor beds may be closed, meaning that the tops of the bed are covered. In a system with open beds, the liquid dispensing system 18 may comprise sprinklers 22 or other types of liquid dispensers that can apply the liquid to the coir. With closed beds, the liquid dispensing system may comprise similar dispensers but inserted into openings on the closed bed. The systems may use other types of liquid dispensing depending upon the configuration and the particular components used, discussed later.

In the system of FIG. 1, the vertical embodiment has a first conveyor bed 20 stacked above the next conveyor bed 24. The material outlet 14 of the first conveyor bed 20 connects to the material inlet of the next conveyor bed 24. The conveyor material outlet of conveyor bed 24 connects to the material inlet layer of the conveyor bed 26. This continues for as many conveyors in the overall apparatus. The material outlet 28 of the lowest conveyor acts as the material outlet of the overall apparatus. At this point, the apparatus may dispense the material outlet onto a conveyor belt, not shown, for further drying and processing. The material outlet may apply pressure to the coir before passing it onto a drying conveyor to speed up the drying by pressing water out of the coir. This may have importance for higher speed processes. Further, the drying conveyor may have some sort of pressure element that squeezes water out of the coir as it exits the rinsing system to speed the process.

In FIG. 1, the system includes one or more probes or sensors such as 30 that provide information to the controller 34. The sensors here network with the controller in a wired fashion, but these sensors may also comprise wireless sensors, such as using Near Field Communications (NFC) technologies like Bluetooth®, infrared, etc. or wireless fidelity, also known as Wi-Fi. As mentioned previously, while these particular components are only shown on one conveyor bed in a vertical configuration, each conveyor may have sensors and liquid dispensers, and these may also exist in any other configuration or embodiment, even if not shown.

Figure 2:
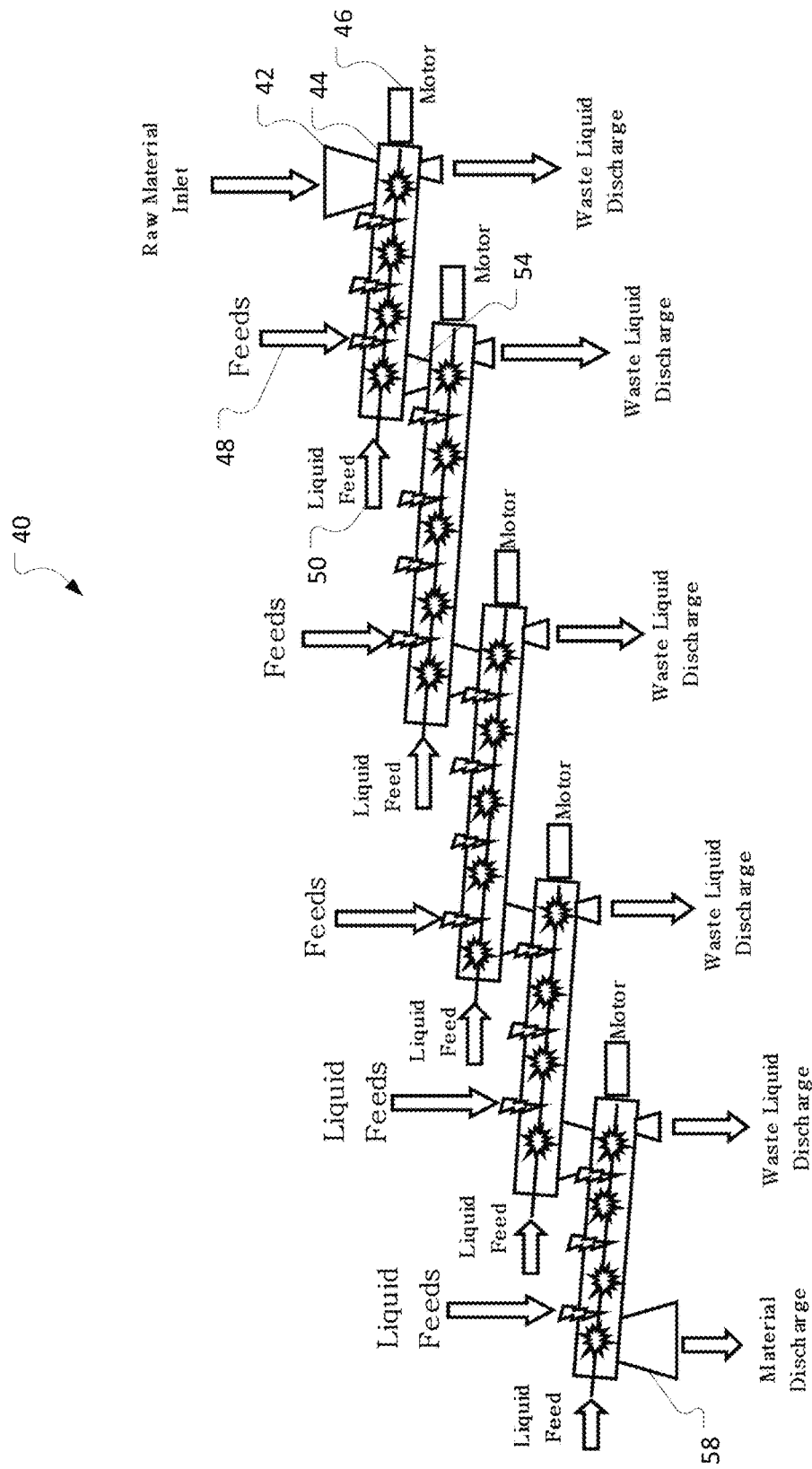
FIG. 2 shows an alternative embodiment of a system for washing and rinsing coir.

The embodiment of FIG. 2 shows an apparatus having a configuration 40 referred to here as "horizontal." In this embodiment, each conveyor bed such as 44 has a material inlet 42 that receives the raw material. The motor 46, which may be common to all beds used in all embodiments, drives the conveyance mechanism within the bed that moves the material from one end of the conveyor bed to the other. The conveyor bed may have liquid feed that feed liquid into the bed such as 48. In some instances the liquid feed may come from the higher end of the conveyor such as 50. In one embodiment, where the conveyance mechanism may comprise a shafted screw conveyor. The shaft may have openings to allow liquid to come in from one end of the shaft and openings to apply the liquid to the coir.

As in the vertical embodiment, the material outlet 54 of one conveyor bed may connect to the material inlet of another bed as shown, until it reaches the final material output 58. This may repeat for as many conveyors as desired. In the horizontal configuration, each succeeding conveyor bed is arranged horizontally from the previous conveyor bed. As in the previous embodiment, the conveyor beds have an angle relative to flat horizontal. Also as in the previous embodiment, the conveyor beds may have an angle in the other direction or may be flat. The choice of configuration lies with the designer and may be based on the nature of the material source, the liquids being used, the space available, etc.

Figure 3:
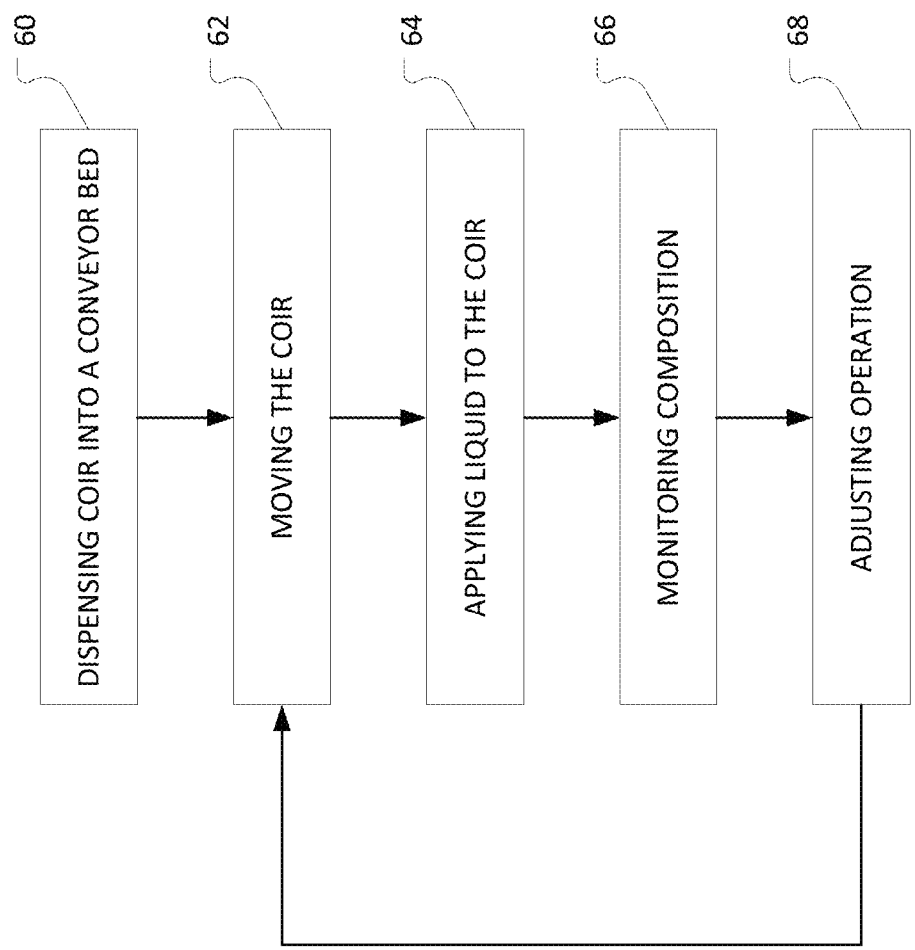
FIG. 3 shows a flowchart of an embodiment of washing and rinsing coir.

FIG. 3 shows a flowchart of an embodiment of a method of rinsing coir. As discussed above, the process begins at 60 by dispensing coir into a conveyor bed as part of the conveyor systems as discussed above. The conveyor systems move the coir at 62 and spread it out to allow it to undergo sterilizing, rinsing, and/or treatment. As mentioned above, the coir can be sterilized by application of either high or low pressure steam through the liquid dispensers in the apparatus. The apparatus can rinse the coir to reduce the electrical conductivity. The rinsing may also include buffering agents, such as calcium nitrate (Ca(NO3)2, to treat the coir and further lower the electrical conductivity. All of these applications are referred to here as liquid at 64. The use of calcium nitrate as a buffering agent is discussed in U.S. patent application Ser. No. 17/153,614, filed Jan. 20, 2021, and incorporated by reference herein in its entirety.

As discussed above, the apparatus may include sensors or probes to monitor the composition of the coir, the waste water, or both. This process could also be done manually by testing the composition to ensure the proper balance of the buffering treatment, monitoring the process at 66. The operation of the apparatus can then be adjusted at 68 as needed. This may include increasing the amount of the liquid, the pressure of the steam, the balance of the elements in the buffering solution, the speed of the conveyors, the rate of dispensing of the coir, among other.

The process of moving, rinsing, monitoring adjusting may repeat as necessary to achieve the desired balance of treatments in the coir material. In addition, if desired, the adjustment may include adding or adjusting the time used to age the material between rinsing and/or application of treatment or buffering agents and the testing part of monitoring to allow the material. This may allow the agents to develop further or finish reactions to achieve a final level for that cycle. The aging may also be included after the monitoring if the monitoring results indicate that the treatment agents have not fully reacted yet. One should note that while the process of FIG. 3 would appear to require an order, no such implication is intended nor should any be inferred. The monitoring, aging and adjusting may occur at any point in the rinsing process.

Figure 5:
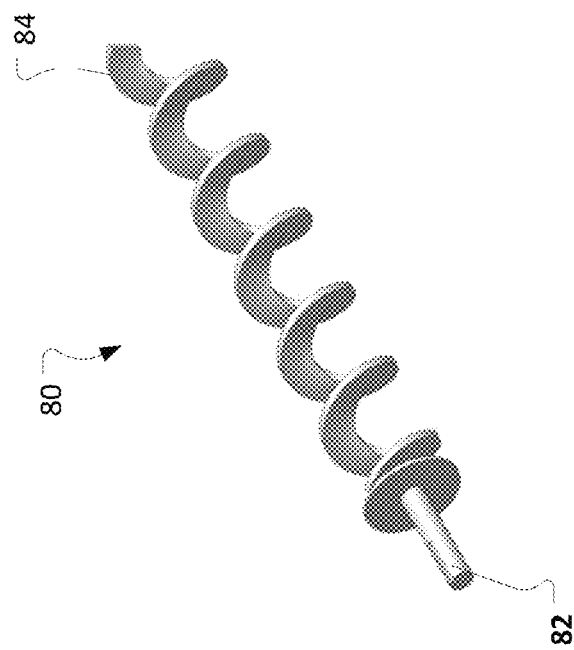
FIG. 5 shows an embodiment of a shaftless screw conveyor.
Figure 4:
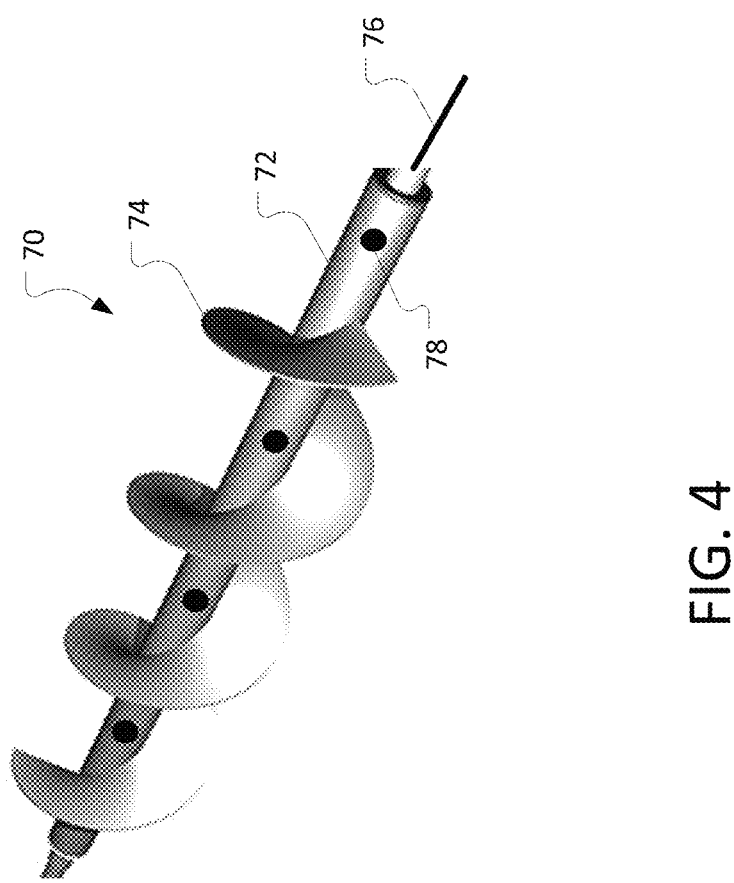
FIG. 4 shows an embodiment of a shafted screw conveyor.

A key aspect of this process and system lies in the ability to spread out the coir and move it at controlled rates. Screw conveyors provide a conveyance mechanism that meets these requirements. The screw conveyor 70 may have shafts such as 72 and the threads or flights such as 74, such as those shown in FIG. 4. The shafts have an advantage that the shaft 72 can be hollow, allowing them to receive liquid 76 that can then exit the shafts through holes such as 78 to dispense the liquids as needed. Other configurations of conveyance mechanisms include shaftless screw conveyors such as 80 as shown in FIG. 5, having a connection point 82 and flights 84.

Figure 6:
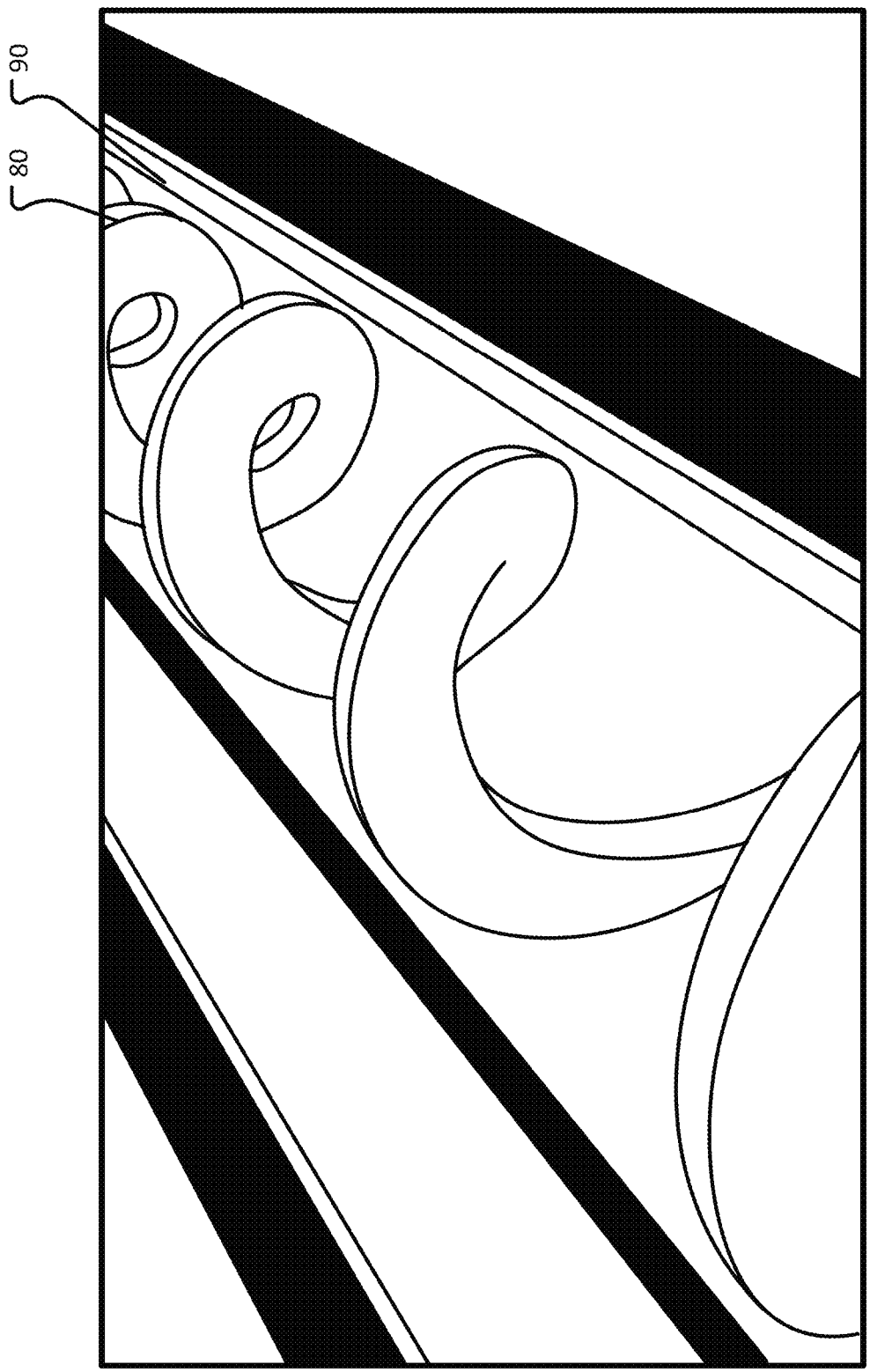
FIG. 6 shows an embodiment of a ceramic lined shaftless screwy conveyor.

In general, the screw conveyors have high contact with the coir and should be made of materials that do not chemically interact with the coir and assist with maintaining the balance. Stainless steel works well for this. In addition, the bed could have a lining. As shown in FIG. 6, showing an open bed screw conveyor 80 with a ceramic lining 90, which can assist with maintaining the cleanliness and the chemical balance. The screws and interior conveyor body maybe ceramic or glass lined. Alternatively, the screws and other components maybe stainless steel. The goal is to reduce rust and other metal containing the coir material.

Figure 7:
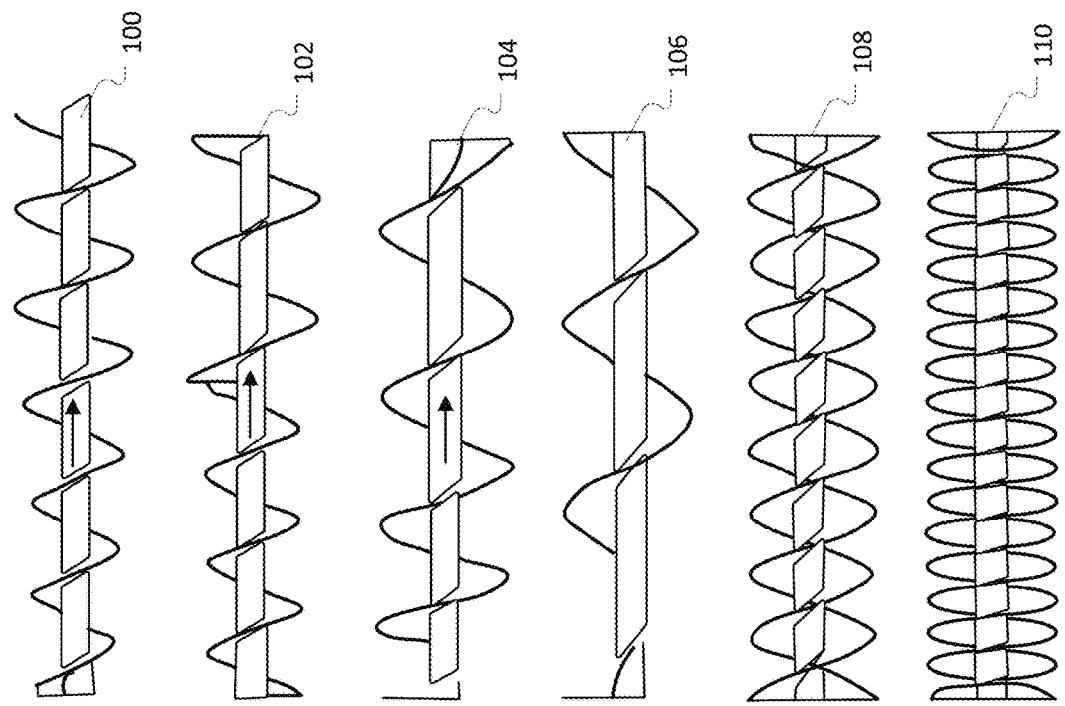
FIG. 7 shows a diagram of screw conveyors of different pitches.

FIG. 7 shows different configurations of screw conveyors. Screw conveyor 100 shows a tapering flight conveyor screw, 102 shows a stepped diameter conveyor screw, 104 shows a stepped pitch conveyor screw, 106 shows a long pitch conveyor screw, 108 shows a double flight conveyor screw, and 110 shows a double flight short pitch conveyor screw. As discussed above, the selection of the conveyance mechanism, and the other process parameters are left up to the system designer based upon the particular aspects of the process for rinsing coir.

In the manner, coir can undergo rinsing, sterilization, and buffering treatments in a controlled fashion with monitoring. This allows for monitoring and adjustment of the process as needed.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the embodiments.

What is claimed is:

1. A method of rinsing coir, comprising:
moving the coir through at least two conveyor beds;
applying liquid to the coir as it moves through the at least two conveyor beds;
monitoring a composition of the liquid in the conveyor beds using sensors inserted into the conveyor beds; and
adjusting application of the liquid based upon the monitoring.

2. The method as claimed in claim 1, wherein applying liquid comprises at least one of applying steam, water, and buffering treatment to the coir.

3. The method as claimed in claim 1, wherein the sensors communicate with a controller to provide information to allow the controller to analyze the information and adjust operations as needed.

4. The method as claimed in claim 1, further comprising aging the coir after applying the liquid.

5. The method as claimed in claim 1, wherein applying liquid to the coir further comprises:
applying steam to sanitize the coir;
rinsing the coir; and
treating the coir.

6. The method as claimed in claim 5, wherein rinsing the coir and treating the coir occurs simultaneously.

7. The method as claimed in claim 1, wherein applying liquid to the coir comprises rinsing the coir with water and at least one buffering agent.

8. The method as claimed in claim 5, wherein rinsing and treating the coir comprises rinsing the coir with water and at least one buffering agent.

9. The method as claimed in claim 4, wherein aging the coir comprises aging the coir for up to 24 hours.

10. A method of rinsing coir, comprising:
moving the coir through at least two conveyor beds;
applying liquid to the coir as it moves through the at least two conveyor beds, applying liquid comprising:
applying steam to sanitize the coir,
rinsing the coir, and
treating the coir;
monitoring a composition of the liquid in the conveyor beds; and
adjusting application of the liquid based upon the monitoring.

11. The method as claimed in claim 10, wherein monitoring the composition comprises using sensors inserted into the conveyor beds.

12. The method as claimed in claim 11, wherein the sensors communicate with a controller to provide information to allow the controller to analyze the information and adjust operations as needed.

13. The method as claimed in claim 10, further comprising aging the coir after applying the liquid.

14. The method as claimed in claim 10, wherein monitoring the composition of the liquid comprises monitoring the composition by manual testing.

15. The method as claimed in claim 10, wherein rinsing the coir and treating the coir occurs simultaneously.

16. The method as claimed in claim 10, wherein rinsing and treating the coir comprises rinsing the coir with water and at least one buffering agent.

17. The method as claimed in claim 13, wherein aging the coir comprises aging the coir for up to 24 hours.

* * * * *